July 17, 1962  H. PACKARD  3,045,196
DIFFERENTIAL TRANSFORMERS
Filed Feb. 13, 1959  2 Sheets-Sheet 1

*INVENTOR.*
HENRY PACKARD
BY
KENWAY, JENNEY, WITTER & HILDRETH
ATTORNEYS

July 17, 1962  H. PACKARD  3,045,196
DIFFERENTIAL TRANSFORMERS
Filed Feb. 13, 1959  2 Sheets-Sheet 2
FIG. 4
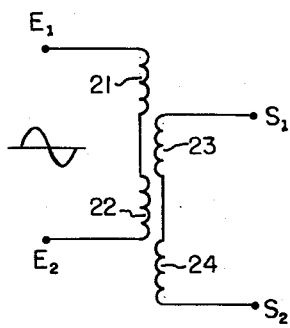
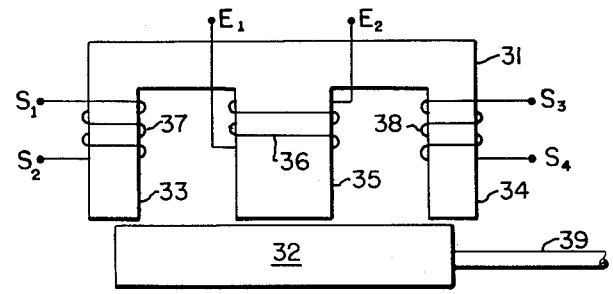
FIG. 5
FIG. 6
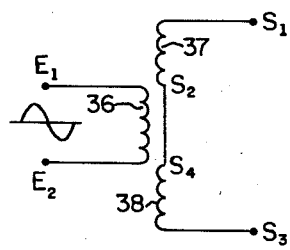
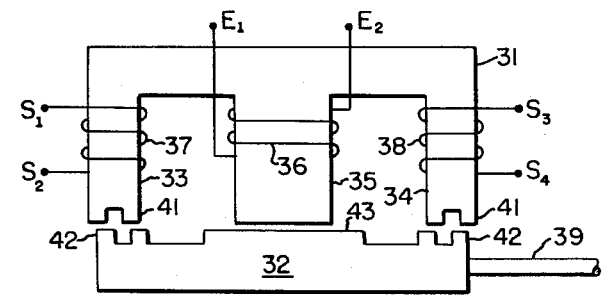
FIG. 7
INVENTOR.
HENRY PACKARD
BY
KENWAY, JENNEY, WITTER & HILDRETH
ATTORNEYS

# United States Patent Office 3,045,196
Patented July 17, 1962

3,045,196
DIFFERENTIAL TRANSFORMERS
Henry Packard, Norwood, Mass., assignor, by mesne assignments, to Northrop Corporation, Beverly Hills, Calif., a corporation of California
Filed Feb. 13, 1959, Ser. No. 793,061
10 Claims. (Cl. 336—135)

The present invention relates in general to new and improved differential transformers, in particular, high-sensitivity differential transformers.

It is the primary object of this invention to provide differential transformers displaying a greater change of flux for a given armature displacement than was heretofore possible without any attendant increase in the power required. Other objects of the invention together with further advantages thereof will become apparent from the following detailed specification in connection with the drawings in which:

FIG. 4 illustrates in schematic form the core windings of the apparatus of FIG. 3;

FIG. 5 illustrates a conventional linear differential transformer;

FIG. 6 illustrates in schematic form the core windings of the apparatus of FIG. 5, and FIG. 7 illustrates the invention as applied to a linear differential transformer.

Figure 1:
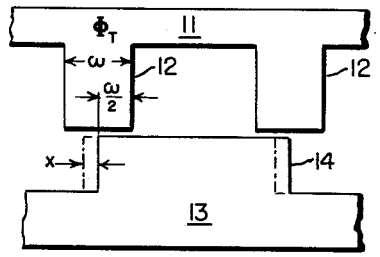
FIG. 1 illustrates a section of a conventional differential transformer.

With reference now to FIG. 1, the drawing shows a section of a conventional differential transformer having a stator 11 which further comprises a pair of stator teeth 12. An armature 13 showing an armature tooth 14 is movably disposed relative to the stator such that the flux linkage between stator and armature teeth respectively can be varied by means of armature motion. In the position shown, where the armature is symmetrically disposed with respect to the illustrated pair of stator teeth, the flux density $B_g$ in the air gap can be shown to be $$Bg = \frac{\Phi_T}{\frac{\omega}{2} \cdot l} = \frac{2\Phi_T}{\omega \cdot l}$$

where $\Phi_T$ = the magnetic flux per stator tooth.
$\omega$ = the width of a stator tooth.
$l$ = the stack length.

If the armature is displaced from the null position shown by a distance $x$ in the direction indicated by the dotted lines in FIG. 1, the change in flux $\Delta\Phi$ can be shown by the application of the differential flux principle to be $$\Delta\Phi = k \frac{4 \cdot x}{\omega} \Phi_T$$

Accordingly, a proportional change in the output signal is obtained, it being understood that a phase reversal occurs when the armature is moved through its null position.

Figure 2:
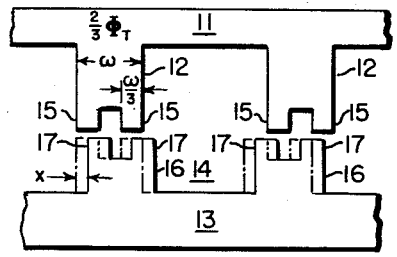
FIG. 2 illustrates a section of the high-sensitivity differential transformer which forms the subject matter of the invention herein.

FIG. 2 illustrates the invention which forms the subject matter of the present application, applicable reference numerals having been carried forward from FIG. 1. It will be noted that the termination of each stator tooth is centrally divided to form a pair of stator sub-teeth 15 spaced from each other by the width of a single sub-tooth, i.e. the width of one-third of a stator tooth. Armature tooth 14 is centrally divided to form a pair of symmetrically disposed projecting portions 16, the termination of each projecting portion being further divided to form a pair of sub-teeth 17. The sub-teeth of each of said latter pairs are dimensioned and spaced identically to those of a stator sub-tooth pair. It will be seen that the spacing of stator sub-tooth pairs exceeds the corresponding armature spacing by the width of one sub-tooth.

If the flux density $B_g$ in the air gap of the apparatus of FIG. 2 remains the same as that of the conventional differential transformer illustrated in FIG. 1, the power requirements will be the same in both cases. In order to obtain this condition, the flux per stator tooth is adjusted to be ⅔$\Phi_T$ such that $$Bg = \frac{\frac{2}{3}\Phi_T}{\frac{\omega}{3} \cdot l} = \frac{2\Phi_T}{\omega \cdot l}$$

Applying the differential flux principle again, a displacement $x$ of armature 13 from its illustrated null position to the position indicated by dotted lines, results in a change of flux $$\Delta\Phi = k \frac{8 \cdot x}{\omega} \Phi_T$$

It will be seen from the equations above that the sensitivity of the apparatus of FIG. 2, i.e. change of flux per unit of armature displacement, is doubled over that obtainable with the conventional apparatus of FIG. 1, without a corresponding increase in the applied power. Accordingly, the output signal due to said flux change is doubled over that obtainable in the apparatus of FIG. 1 for the same armature displacement, a phase reversal again occurring when the armature moves through the null position.

Figure 3:
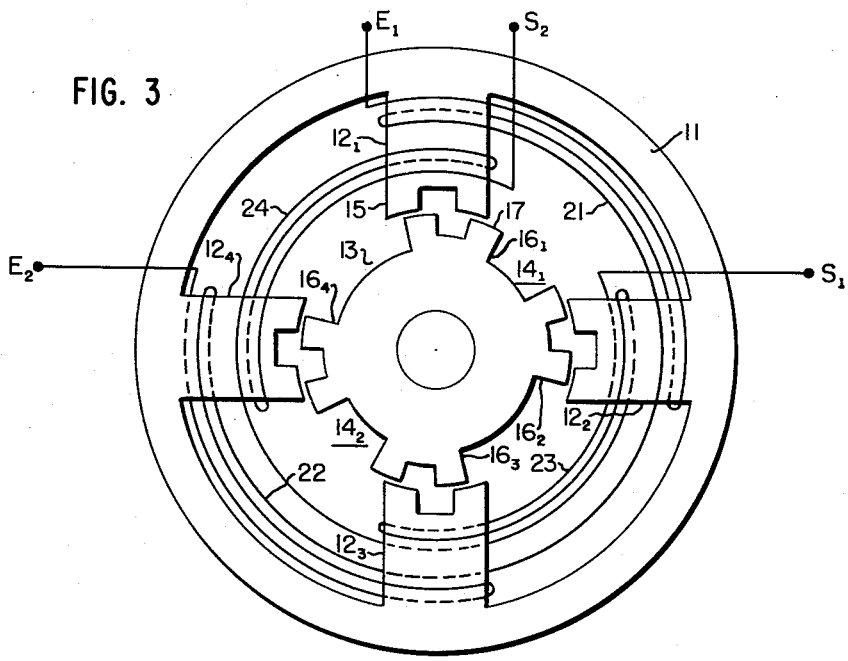
FIG. 3 illustrates the invention as applied to a differential transformer of the microsyn type.

FIG. 3 illustrates the invention as applied to a microsyn differential transformer, applicable reference numerals having again been retained. Stator 11 consists of a ring-like core structure having stator teeth 12 pointing radially inward to the center of the ring. The termination of each stator tooth is centrally divided in the manner described in connection with FIG. 2, to provide a pair of stator sub-teeth 15. Rotor armature 13 is rotatably disposed in the center of the ring and has sub-teeth 17 extending radially outward from the ring center into mutually confronting relationship with said stator sub-teeth. Both rotor and stator sub-teeth respectively, are spaced on opposite sides of a circular, concentric perimeter (not shown), said spacing determining the air gap. In general, the stator has twice as many teeth as the rotor. Thus, a single pair of rotor teeth $14_1$ and $14_2$ respectively, exists for the two pairs of stator teeth $12_1$, $12_2$ and $12_3$, $12_4$ respectively. Rotor tooth $14_1$ comprises projecting portions $16_1$ and $16_2$, while rotor tooth $14_2$ includes projecting portions $16_3$ and $16_4$. The termination of each of the aforesaid projecting portions is sub-divided to form a pair of rotor sub-teeth 17, the sub-teeth comprising each pair having a spacing and dimensions along said perimeter equivalent to that of a stator sub-tooth pair. As illustrated in FIG. 3, the perimetral spacing of stator sub-tooth pairs remains the same around the stator ring.

The perimetral spacing of projecting rotor portions $16_1$ and $16_2$, on the other hand, falls short of the corresponding spacing of stator teeth $12_1$ and $12_2$ by the width of one sub-tooth. Accordingly, when rotor 13 is in its null position relative to the stator as illustrated in the drawing, each sub-tooth comprising rotor tooth $14_1$ is displaced to one side relative to its corresponding stator sub-tooth by one-half the width of a sub-tooth. It will be noted that the sub-teeth comprising projecting portion $16_1$ are displaced in a clockwise direction with respect to the sub-teeth of stator tooth $12_1$ while the sub-teeth comprising projecting portion $16_2$ are displaced in a counter-clockwise direction with respect to the corresponding sub-teeth of stater tooth $12_2$. A similar situation exists in the case of the sub-teeth of rotor tooth $14_2$ with respect to the corresponding sub-teeth of stator teeth $12_3$ and $12_4$ respectively. In will be further noted that the spacing of projecting portions $16_2$ and $16_3$ belonging to rotor teeth $14_1$ and $14_2$ respectively, exceeds the corresponding spacing between stator teeth $12_2$ and $12_3$ by the width of one sub-tooth. In view of the symmetrical positioning of rotor and stator teeth around the ring, the relationship described above is repeated. An excitation winding 21 links stator teeth $12_1$ and $12_2$ and is connected in series to an excitation winding 22 linking stator teeth $12_3$ and $12_4$. Terminals $E_1$, $E_2$ are adapted to receive an excitation signal. An output winding 23 links stator teeth $12_2$ and $12_3$ and is connected in series with an output winding 24 linking stator teeth $12_4$ and $12_1$. An output signal, whose amplitude depends on the rotor position, is obtained at terminals $S_1$ and $S_2$. The windings are illustrated in schematic form in FIG. 4. It will be noted that the windings link the stator teeth in staggered fashion.

In operation, an A.C. excitation signal is applied to terminals $E_1$, $E_2$ in order to produce the requisite flux in each stator tooth. Depending on the rotor position which establishes the amount of flux linkage by variation of the air gap, an output signal is obtained at terminals $S_1$, $S_2$ which is representative of the angular rotor displacement, the sensitivity being double that of a conventional microsyn having comparable power consumption, as explained in connection with FIGS. 1 and 2.

FIG. 5 illustrates a conventional linear differential transformer having a stator 31 which further comprises stator teeth 33 and 34 symmetrically disposed to either side of a central projecting portion 35 of twice the cross-sectional area of either stator tooth. The stator teeth as well as projecting portion 35 terminate in a common plane. An armature 32 is positioned parallel to the aforesaid common plane and is spaced a predetermined distance therefrom to produce a flux gap. By means of force applied to shaft 39, the armature is adapted to move in a direction parallel to said plane in order to vary the flux linkage with respective stator teeth. An excitation winding 36 links central projecting portion 35 and is adapted to receive an excitation signal at terminals $E_1$, $E_2$. Stator teeth 33 and 34 are respectively linked by output windings 37 and 38 which are connected in series, as shown schematically in FIG. 6. An output signal whose magnitude depends on the displacement of the armature from the null position shown, is derived at output terminals $S_1$, $S_3$.

FIG. 7 illustrates the invention, as applied to the linear differential transformer of FIG. 5, applicable reference numerals having been carried forward. The termination of each stator tooth 33 and 34 respectively, is divided centrally to form a pair of sub-teeth 41 spaced from each other by the width of one sub-tooth. In similar manner, armature 32 comprises two pairs of sub-teeth 42, the dimensions and spacing of the sub-teeth within each pair being identical to that of a stator pair. A raised central portion 43, is disposed opposite the projecting stator portion 35 and has a cross-sectional area exceeding the latter in order to maintain flux linkage with projecting portion 35 with armature displacement. It will be noted that the spacing of the respective stator sub-tooth pairs from each other exceeds the corresponding rotor spacing by the width of one sub-tooth. As in the case of FIG. 3, corresponding stator and rotor sub-tooth pairs are displaced from each other by the width of half a sub-tooth in the null position shown.

The operation follows closely that described in connection with FIG. 3 the sensitivity being double that of a conventional linear differential transformer having comparable power consumption. Accordingly, for a corresponding armature displacement, an output signal is obtained at terminals $S_1$, $S_3$ which is twice the amplitude of that obtainable with the linear differential transformer of FIG. 5.

The invention described is applicable to rotary as well as linear differential transformers and provides an increase in sensitivity heretofore unobtainable without a corresponding increase in power. The sensitivity of conventional apparatus is multiplied by a factor dependent on the number of sub-teeth in each sub-tooth group. It will be understood therefore, that the invention is not confined to apparatus using sub-teeth grouped in pairs but that a further increase in the number of sub-teeth will bring about a corresponding increase of sensitivity.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

I claim:

1. A differential transformer comprising a stator having $2n$ stator teeth each divided into a plurality of sub-teeth, an armature having $n$ armature teeth, each armature tooth comprising a pair of projecting portions, each of said projecting portions corresponding to a stator tooth and being divided into a like plurality of sub-teeth, the spacing between successive stator teeth exceeding the corresponding spacing between projecting armature portions by the width of one sub-tooth.

2. A differential transformer comprising first and second cores movably disposed with respect to each other, said first core having a plurality of sub-teeth arranged in successive, identical groups, said second core comprising a like plurality of identically dimensioned sub-teeth arranged in groups equal in size to said first core groups, the sub-teeth of both said cores being spaced alike within respective groups, the spacing between corresponding sub-teeth of successive first core groups exceeding the corresponding second core spacing by the width of one sub-tooth.

3. A high-sensitivity microsyn comprising a stator including a stator ring, said stator ring having $2n$ stator teeth projecting radially toward the center of said ring, the termination of each stator tooth being centrally divided to form a pair of sub-teeth spaced from each other by substantially the width of a single sub-tooth, a rotor armature disposed concentrically within said stator ring and adapted to rotate about an axis through said center, said rotor comprising $n$ teeth projecting radially outward therefrom, each of said rotor teeth comprising a pair of symmetrically projecting portions, each projecting portion being centrally divided to form a pair of rotor sub-teeth of substantially the same dimensions and spacing as the sub-teeth of a stator pair, the sub-teeth of said stator and rotor respectively being disposed to face each other along a concentric perimeter within said ring and being spaced in opposite directions from said perimeter to form a flux gap therebetween, successive pairs of stator sub-teeth being spaced at regular intervals along said perimeter, the perimetral spacing of successive rotor pairs alternately exceeding and falling short of the corresponding stator spacing by the perimetral width of one sub-tooth.

4. The apparatus of claim 3 and further comprising an excitation winding linking successive pairs of stator teeth, successive excitation windings being connected in series, means for applyng an excitation signal to said excitation windings, a plurality of output windings connected in series, adjacently positioned stator teeth belonging to separate, successive ones of said last recited pairs being paired by respective linking output windings, means for deriving an output signal from said output windings, the amplitude of said output signal depending on the relative position of said rotor and said stator.

5. A linear differential transformer including a stator core, said stator core comprising at least one pair of identical stator teeth having a predetermined cross-sectional area and a projecting stator portion of twice said cross-sectional area positioned midway therebetween, said stator teeth and said projecting stator portion terminating in a first common plane, the terminating portion of each of said stator teeth being centrally divided to form a pair of sub-teeth spaced from each other by substantially the width of a single sub-tooth, an armature comprising one pair of armature sub-teeth corresponding to each stator sub-toothed pair, the sub-teeth of each of said armature pairs having the same dimensions and spacing as the sub-teeth of a stator pair, said armature further comprising a raised central portion positioned midway between said armature sub-toothed pairs and having a cross-sectional area exceeding that of said projecting stator portion, said armature sub-teeth and said raised central portion terminating in a second common plane parallel to said first common plane and spaced therefrom to determine a flux gap, said armature being movably disposed relative to said stator to permit travel of the armature sub-teeth in said second common plane, the spacing between said pairs of stator sub-teeth exceeding the corresponding armature spacing by the width of one sub-tooth.

6. The apparatus of claim 5 and further comprising an excitation winding linking said projecting stator portion, means for applying an excitation signal to said excitation winding, an output winding linking each of said stator teeth, respective output windings being connected in series, means for deriving an output signal from said output winding, the amplitude of said output signal depending on the relative position of said armature and said stator.

7. A differential transformer comprising two magnetic members, one of said members being movable relative to the other, each said member including a plurality of teeth disposed in juxtaposition to a similar plurality of teeth of the other member, each tooth of said pluralities of teeth being divided into a plurality of similar sub-teeth, the teeth of one of said members being equally spaced a given distance one from another, the teeth of the other of said members being alternately spaced said given distance plus the width of one of said sub-teeth and said given distance less the width of one of said sub-teeth.

8. A differential transformer comprising two magnetic members movably disposed with respect to each other, said members having like numbers of sub-teeth of equal width arranged in groups to form individual similar teeth, the teeth of one of said members being equally spaced one from another, successive teeth of the other of said members being alternately spaced a greater and a lesser distance than those of said one of said members.

9. A differential transformer as defined in claim 8 wherein the successive teeth of the other of said members are alternately spaced apart a distance greater by the width of one sub-tooth and lesser by the width of one sub-tooth than the teeth of said one of said members.

10. A differential transformer as defined in claim 9 wherein said one magnetic member is a stator and said other magnetic member is a rotor, the teeth of said rotor being disposed substantially in juxtaposition to the teeth of said stator.

References Cited in the file of this patent
UNITED STATES PATENTS

| | | |
|---|---|---|
| 2,669,126 | Simmons | Feb. 16, 1954 |
| 2,847,664 | Lewis | Aug. 12, 1958 |
| 2,866,913 | Kronacher | Dec. 30, 1958 |
| 2,905,874 | Kelling | Sept. 22, 1959 |